United States Patent

Takamiya et al.

Patent Number: 5,163,884
Date of Patent: Nov. 17, 1992

[54] FRICTION-TYPE STEPLESS SPEED CHANGE DEVICE

[75] Inventors: Kikuzo Takamiya, Kitamoto; Yoshitaka Tamura, Kita-Saitama; Nobuaki Shimada, Ageo; Kiyofumi Hirai, Urawa, all of Japan

[73] Assignee: Bridgestone Cycle Co., Ltd., Japan

[21] Appl. No.: 694,094

[22] Filed: May 1, 1991

[30] Foreign Application Priority Data

May 8, 1990 [JP] Japan .................. 2-116750

[51] Int. Cl.⁵ .............................. F16H 15/18
[52] U.S. Cl. ........................ 475/215; 74/199
[58] Field of Search ........... 74/199; 475/214, 215, 475/217

[56] References Cited

U.S. PATENT DOCUMENTS

| | | | |
|---|---|---|---|
| 2,216,642 | 10/1940 | Davis | 74/199 |
| 2,233,967 | 3/1941 | Wellton | 475/215 X |
| 2,583,496 | 1/1952 | Rougelot | 74/199 |
| 2,815,670 | 12/1957 | Jorgensen | 74/199 |
| 2,939,345 | 6/1960 | Burns | 74/199 |
| 3,736,803 | 6/1973 | Horowitz et al. | 74/192 |
| 3,793,897 | 2/1974 | Froumajou | 74/199 |
| 4,934,205 | 6/1990 | Takamiya et al. | 74/199 |
| 5,030,183 | 6/1991 | Takamiya et al. | 475/215 |

FOREIGN PATENT DOCUMENTS

| | | | |
|---|---|---|---|
| 0481565 | 3/1952 | Canada | 475/215 |
| 519879 | 12/1955 | Canada | 74/199 |
| 74328 | 12/1944 | Czechoslovakia | 475/215 |
| 1187881 | 5/1961 | Fed. Rep. of Germany | . |
| 63-130954 | 6/1988 | Japan | . |
| 63-130956 | 6/1988 | Japan | . |
| 72120 | 5/1947 | Norway | 74/199 |
| 2047823 | 12/1980 | United Kingdom | 74/199 |

*Primary Examiner*—Leslie A. Braun
*Assistant Examiner*—Ryan W. Massey
*Attorney, Agent, or Firm*—Parkhurst, Wendel & Rossi

[57] ABSTRACT

A friction-type stepless speed change device includes a frictional transmission elements composed of a pair of driving discs connected to an input shaft, and an annular driven disc connected to an output shaft and embraced between and urged against opposite conical surfaces of the driving discs into wedge-engagement to generate frictional force and allow power transmission from the driving discs to the driven disc. The driving discs are at a variable eccentricity relative to the driven disc, with which an effective pitch diameter of the driving discs is varied to effect a stepless speed change. For reducing the size of the frictional transmission elements while preserving a required torque capacity, the device further comprises a driving rotary unit for transmitting power from the input shaft to the driving discs at an increased rotational speed, and a driven rotary unit for transmitting power from the driven disc to the output shaft at a reduced rotational speed.

9 Claims, 5 Drawing Sheets

FIG_2

FIG._3

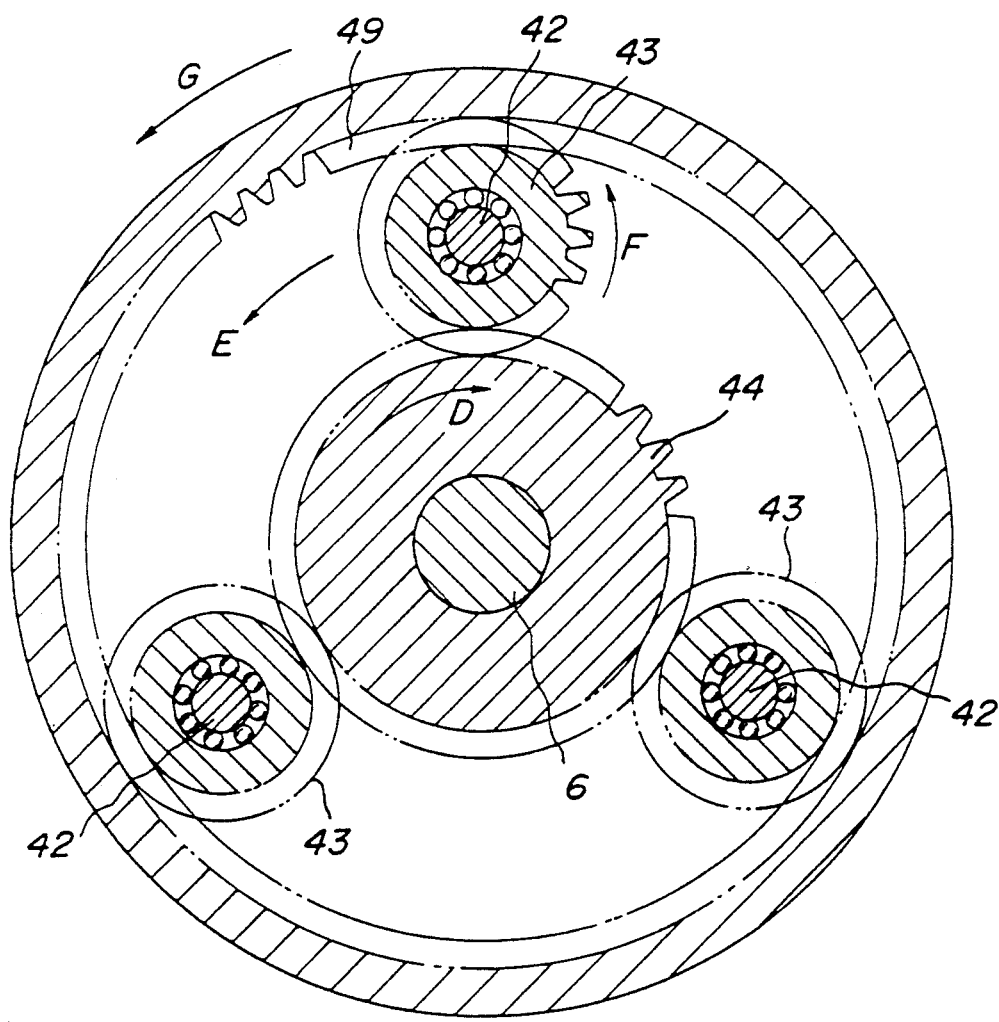
FIG_5

FRICTION-TYPE STEPLESS SPEED CHANGE DEVICE

BACKGROUND OF THE INVENTION

1. Field of the Invention

This invention relates to a friction-type stepless speed change device for general purposes, and more particularly to a friction-type stepless speed change device which is suitable for use in various kinds of industrial machines, transportation machines and the like.

2. Description of the Related Art

A friction-type stepless speed change device generally includes driving and driven friction wheels typically in the form of cones, discs, rings, spherical members and the like, which are urged into contact with each other. The contact position between the two friction wheels can be displaced to adjust the rotating radii of the respective friction wheels and thereby change the rotational speed of the driven friction wheel in a stepless manner. Depending upon the mode of contact between the friction wheels, the friction-type stepless speed change device is often classified into two types, i.e. external contact type and internal contact type.

In relation to external contact type speed change devices, transmission between the friction wheels is achieved by substantially point-like contact between two normally convex surfaces, so that the contact area is of substantially elliptical shape due to the contact pressure. Thus, when the contact area is observed as a rotary body, the contact track corresponding to the pitch lines is formed of a wide, belt-like area. Consequently, positive and negative slips occur on the outer and inner sides of the pitch diameter, respectively, and such slips result in increase in the internal friction loss to lower the transmission efficiency.

On the other hand, in the case of internal contact type speed change device, the transmission between the friction wheels is accomplished by contact between a concave surface and a convex surface, and the contact area or contact track is of substantially crescent-shaped, and is longer and narrower than that of the external contact type speed change device. Consequently, the contact can be assumed a line contact, and it is thus possible to significantly reduce the difference in rotational speed between outer and inner sides of the pitch diameter at the contact portion, and thereby reduce the internal friction loss.

As can be appreciated from the above explanation, in view of transmission efficiency, the internal contact type is generally superior to the external contact type since it is desirable for the friction discs to have a contact track of as reduced a width as possible.

The inventors already proposed certain improvement in the stepless speed change device which effectively makes use of the internal contact, and which is disclosed in Japanese Patent Application Publication No. 1-37,623.

The stepless speed change device according to the previous proposal includes input and output shafts, driving friction wheels which are adjustable in eccentricity relative to the input shaft, an internal gear arranged concentric to and formed integrally with the driving friction wheels, and a pair of internal gears which are arranged concentric to and formed integrally with the input shaft, one of which is connected via an intermediate transmission gear to the first-mentioned internal gear which is integral with the driving friction wheels. The speed change device further includes a hollow cylindrical driven rotary unit provided rotatably about the axis of the input shaft, driven friction wheels provided on the inner circumference of the driven rotary unit so as to be rotatable therewith and adapted to engage with the driving friction wheels under pressure, and a planet carrier integrally provided on the driven rotary unit. Planet gears are rotatably supported on the planet carrier and meshed with the other of the pair of internal gears, and also with a sun gear formed integrally with the output shaft which is arranged concentric to the input shaft. For changing the eccentricity of the driving friction wheels, they are formed into an integral driving rotary unit and fitted on an eccentric cam assembly composed of an internal cam member which is eccentrically fitted on the input shaft, and an external cam member which, in turn, is eccentrically fitted on the internal eccentric cam, but maintained in a concentric relation with the input shaft.

In general, a friction-type stepless speed change device transmits torque by friction at a contact point between the friction wheels, so that there is a limitation in increasing the torque which can be transmitted. To this end, friction wheels of a large diameter are usually employed to increase the rotational radii at the contact point and thereby increase the transmission torque. As a result, not only the device as a whole tends to become heavy and bulky due to the provision of large-sized friction wheels or the like components, but also the device is expensive to manufacture due to the requirement of high accuracy for these components.

Furthermore, in the case of a speed change device wherein the driven friction wheels of large diameter are maintained in parallel with each other by limited support portions only, as in the device according to the above-mentioned previous proposal, the driven friction wheels are in point contact with the driving friction wheels only at a single point so that the driven friction wheels may be subjected to eccentric load. It is often difficult to maintain the two driven friction wheels in parallel with each other, and the driving and driven friction wheels may thus contact each other in undesirable condition, accompanied by reduced transmission torque, fluctuation in the transmission efficiency or difficulty in achieving a smooth operation for changing the eccentricity of the driving friction wheels.

SUMMARY OF THE INVENTION

Accordingly, it is a primary object of the invention to provide an improved friction-type stepless speed change device which is small-sized and capable of transmitting large torque with high transmission efficiency.

To this end, according to the invention, there is provided a friction-type stepless speed change device including an input shaft, an output shaft, a pair of driving discs connected to said input shaft such that they are axially movable relative to each other, and having conical surfaces, respectively, which are arranged opposite to each other, spring means for urging said driving discs toward each other, an annular driven disc connected to said output shaft and movable relative to the driving discs to have a variable eccentricity, said driven disc having an inner peripheral edge which is embraced between and urged against the conical surfaces of said driving discs into a wedge-engagement for generating a frictional force to allow power transmission from the driving discs to the driven disc, means for steplessly varying the eccentricity of said driving discs relative to the driven disc to effect a stepless speed change, wherein said device comprises a driving rotary unit for transmitting power from the input shaft to the driving discs at an increased rotational speed, and a driven rotary unit for transmitting power from the driven disc to the output shaft at a reduced rotational speed.

With the above-mentioned arrangement according to the invention, the driving discs embrace therebetween the inner peripheral edge of the annular driven disc under pressure with the conical surfaces so that these discs are engaged with each other with the tapered surfaces essentially in the same manner as wedges. Such engagement is thus referred to herein as "wedge-engagement".

While power is generally expressed as a product of force and velocity, in the case of the stepless speed change device as in the invention, the power which can be transmitted is expressed as a product of force transmitted by the friction discs and the rotational speed thereof. According to the invention, the rotation of the input shaft is transmitted to the driving and driven rotary units at an increased speed, while the increased speed of the driven rotary unit is reduced such that the output shaft is rotated at a speed which is substantially equal to the rotational speed of the input shaft.

In the device according to the present invention, therefore, the friction transmission components are rotated at a higher speed which is several times the rotational speed of the input shaft, so that a higher power can be transmitted even by small components. In other words, according to the invention, by virtue of the friction transmission components which are rotated at higher speed, the friction discs can be made small-sized while preserving necessary performance for transmitting a large power with improved transmission efficiency.

The invention will be more fully understood by referring to the following detailed specification and claims taken in connection with the appended drawings.

BRIEF DESCRIPTION OF THE DRAWINGS

FIG. 5 a sectional view illustrating the planetary gear unit used in the device shown in FIG. 1.

DESCRIPTION OF THE PREFERRED EMBODIMENT

Figure 1:
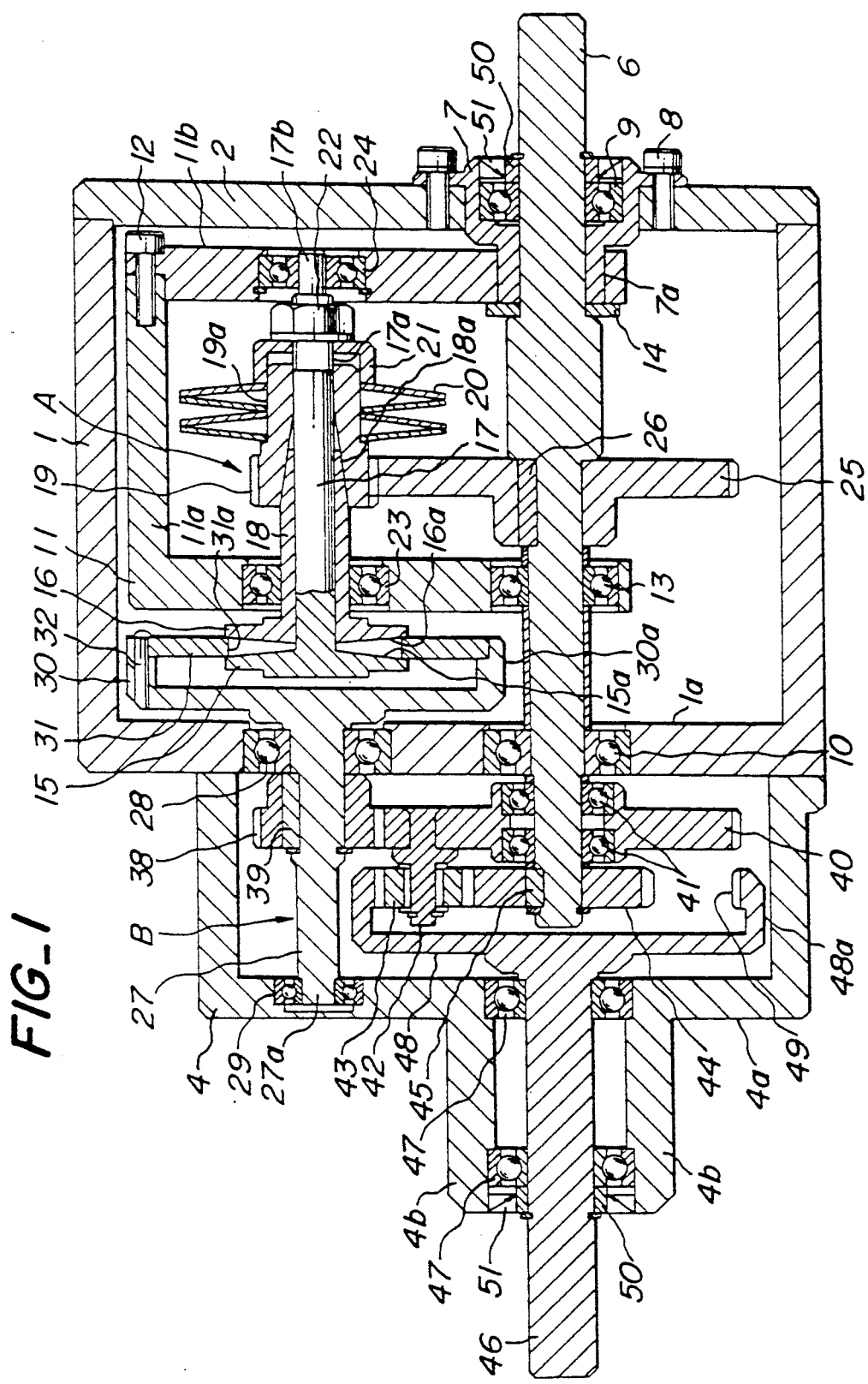
FIG. 1 is a sectional view illustrating one embodiment of the stepless speed change device according to the invention.

Referring to FIGS. 1-5 illustrating one embodiment of the invention, the friction-type stepless speed change device includes a box-shaped main casing 1 having an input side closed by a cover 2 which is secured to the main casing 1 by means of bolts 3, and an output side provided with a sub-casing 4 which is fixed to the main casing 1 on the output side by means of bolts 5.

In this embodiment, an input shaft 6 extends through the cover 2 and an end wall 1a on the output side of the main casing 1. The input shaft 6 is rotatably supported by a ball bearing 9 provided in a generally cylindrical bearing holder 7 with a flange which is fixed to the casing cover 2 by means of bolts 8, and also by a ball bearing 10 provided in the output side wall 1a of the main casing 1.

Figure 2:
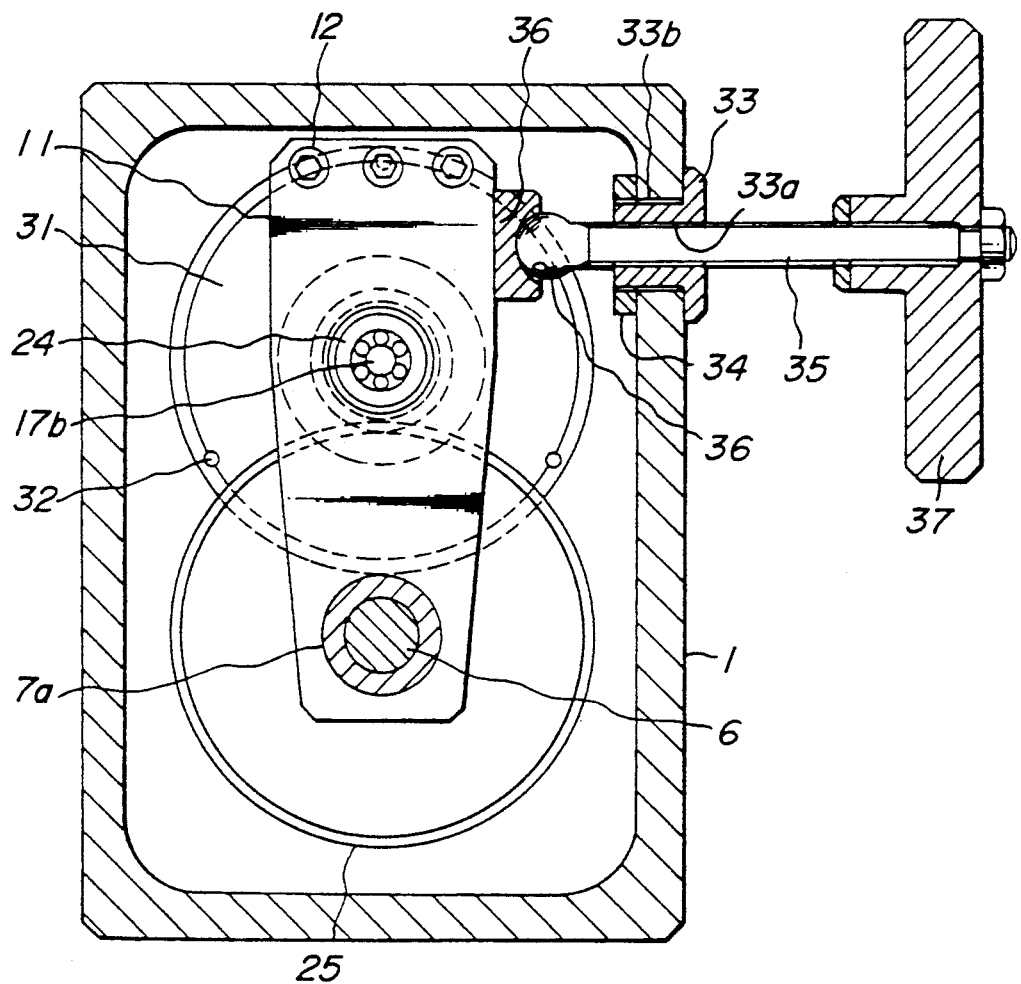
FIG. 2 is a sectional view of the eccentricity adjusting mechanism of the device of FIG. 1, as seen from the side of the input shaft.

A rocker arm 11 is provided within the casing 1, which is of substantially inverted U-shaped configuration as shown in FIG. 1, and substantially in the form of an elongated rectangle in FIG. 2. The rocker arm 11 is pivotally supported by the input shaft 6 so as to be swung about the rotational axis of the input shaft 6. More particularly, the rocker arm 11 is composed of a main body 11a of substantially L-shaped cross-section, and an input side member 11b fixed to the main body 11a by means of bolts 12. The main body 11a has a leg end which is rotatably supported on the input shaft 6 by means of a ball bearing 13. The input side member 11b also has a leg end which is rotatably supported directly on the cylindrical portion 7a of the bearing holder 7 on the input shaft 6. An annular plate 14 is fitted on a shoulder of the input shaft 6 adjacent to the bearing holder 7.

The stepless speed change device further includes two driving discs 15, 16 which are respectively formed with conical surfaces 15a, 16a arranged in opposition to each other. The driving disc 15 is provided with a driving shaft 17 at the center of its conical surface 15a. The other driving disc 16 is provided on its side opposite to the conical surface 16a with a cylindrical shaft 18 which is fitted on the driving shaft 17 of the driving disc 15. The cylindrical shaft 18 has a tapered free end 18a on which is fitted a cylindrical shaft 19a of a small-diameter gear 19.

Two pairs of substantially dish-shaped disc springs 20 are fitted on the cylindrical shaft 19a and retained by a shoulder on the shaft 19a so as to serve as an axial compression spring. A cup-shaped spring retainer 21 is fitted on the driving shaft 17 to compress the disc springs 20, while a nut 22 is threadedly engaged on a screw-threaded portion 17a formed on the driving shaft 17 so that the opposed conical surfaces 15a and 16a of the driving 16 are always forced toward each other by means of the disc springs 20. The assembly including the driving discs 15 and 16 is rotatable in unison and forms a driving rotary unit as shown at A in FIG. 1.

The cylindrical shaft 18 of the driving rotary unit A extends through the intermediate region of the leg portion of the rocker arm main body 11a, and is rotatably supported by a ball bearing 23. On the other hand, the screw-threaded portion 17a of the driving shaft 17 has a free end provided with a reduced diameter portion 17b which is rotatably supported by a ball bearing 24 at an intermediate region of the input side portion 11b of the rocker arm 11.

A large-diameter gear 25 is provided on the input shaft 6 with a key 26 therebetween, and adapted to be meshed with the small-diameter gear 19 so that rotation of the input shaft 6 is transmitted to the driving rotary unit A with an increased rotational speed.

A driven shaft 27 is arranged concentric to the driving shaft 17 to pass through the output side wall 1a of the main casing 1, and rotatably supported by a ball bearing 28 in the output side wall 1a. One end 27a of the driven shaft 27 is rotatably supported by a ball bearing 29 provided in a wall 4a of the output side casing 4. The driven shaft 27 is provided at the other end with a support member 30 for the driven disc 31, which member is in the form of a disc having a rising edge 30a at its periphery. The driven disc 31 is an annular disc having a center bore, and is fixed to the end of the rising edge 30a of the support member 30 by means of rivets 32. The annular driven disc 31 and a small-diameter gear 38 to be explained below are integrally joined together as part of a driven rotary unit B. The inner periphery 31a of the driven disc 31 is embraced between the conical surfaces 15a and 16a of the driving discs 15 and 16, and urged therebetween by the spring force of the disc springs 20.

Figure 3:
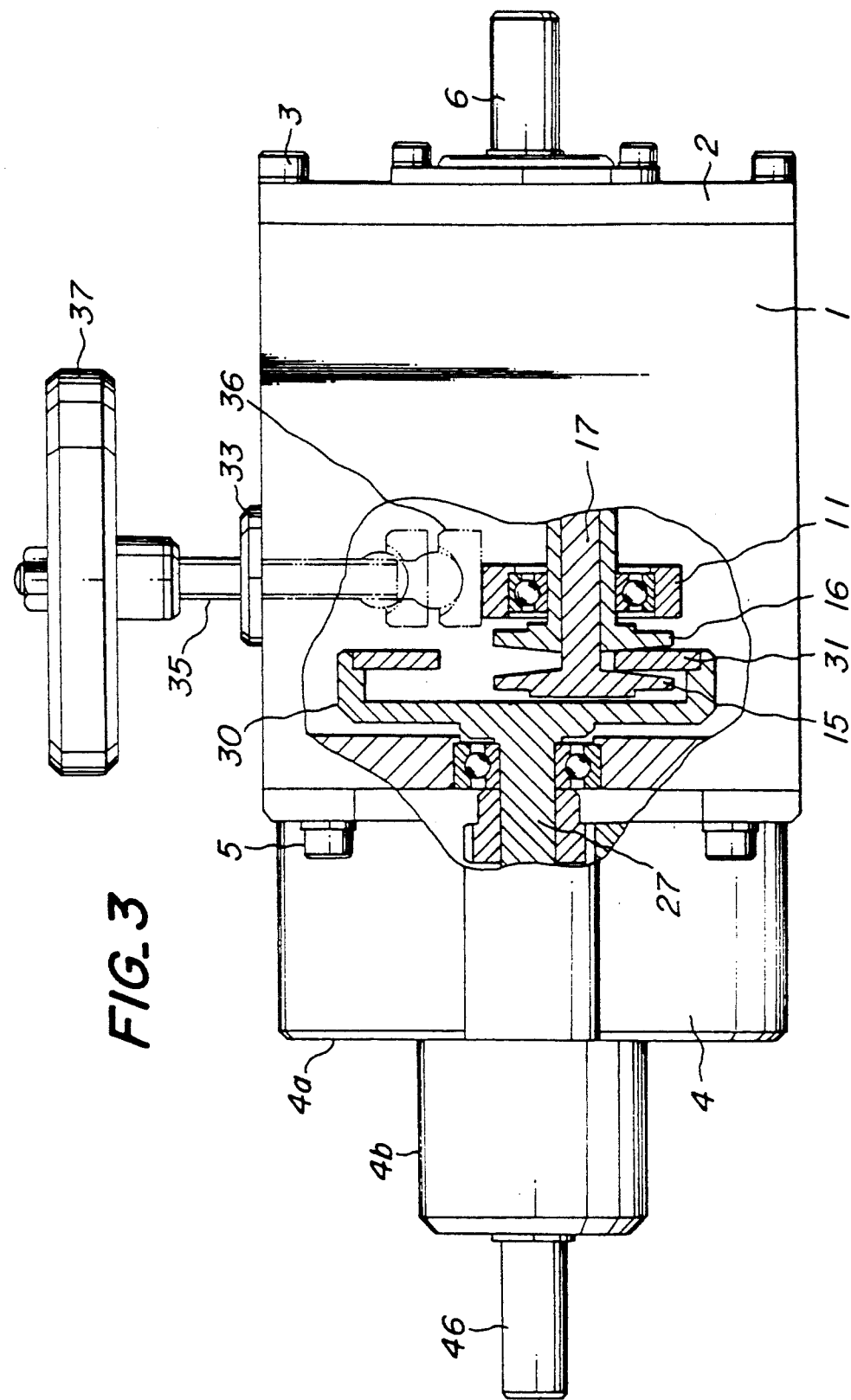
FIG. 3 is a plan view illustrating in partial section a wedge-engaged state of the eccentric friction discs of the device shown in FIG. 1.
Figure 4:
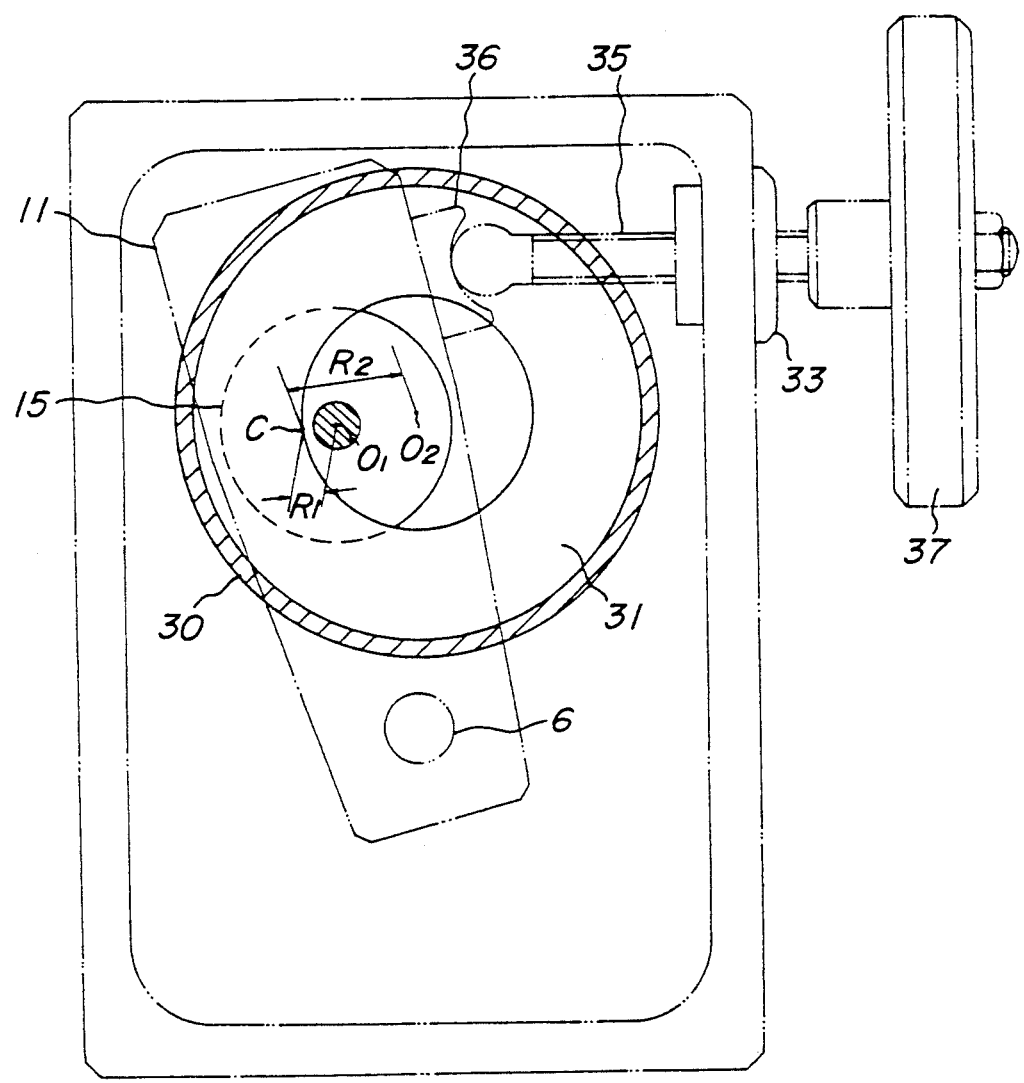
FIG. 4 is an explanatory view illustrating a wedge-engaged state of the eccentric friction discs in section perpendicular to the driving shaft of the device.

As shown in FIGS. 2 to 4, a flanged screw member 33 is threadedly engaged in a wall of the casing 1 which is in opposition to the leg of the rocker arm main body 11a. The screw member 33 is formed at its center with a female screw 33a, and on its outer circumference with a male screw 33b. The screw member 33 is fixedly secured to the wall of the main casing 1 by means of a lock nut 34 which is threadedly engaged on the end of the male screw 33b. A feed screw 35 is threadedly engaged in the female screw 33a, and is formed at its free end with a spherical portion which is adapted to abut against a spherical recess 36a of a receiving member 36 fixedly secured to a side surface of the rocker arm 11. A hand-wheel 37 is fixed to the external end of the feed screw 35. By operating the hand-wheel 37, the rocker arm 11 can be swung about the axis of the input shaft 6 into a desired eccentric position between the vertical position shown in FIG. 2 and the tilted position shown in FIG. 4.

The above-mentioned small-diameter gear 38 is fixedly secured to the driven shaft 27 in the output side casing 4 with a key 39 therebetween, while a large-diameter gear 40 is rotatably provided on the input shaft 6 through two ball bearings 41 so as to be meshed with the small-diameter gear 38. The large-diameter gear 40 is provided with three planet shafts 42 (FIG. 5) at circumferentially equidistant locations to extend into the output side in order to form a planet carrier. Three planet gears 43 are rotatably provided on the planet shafts 42, respectively, while a sun gear 44 is fixed to the input shaft 6 with a key 45 therebetween, so as to be engaged with the planet gears 43 to form a planetary gear unit.

An output shaft 46 is arranged concentric to the input shaft 6, and rotatably supported by two ball bearings 47 provided in a hub 4b of the output side casing 4. The output shaft 46 is integrally formed with a disc 48 at its end in opposition to the input shaft 6. The disc 48 is formed along its outer circumference with a rising edge 48a which is formed in its inner circumference with an internal gear 49 to be meshed with the planet gears 43. Reference numeral 50 denotes a collar member for holding an oil seal 51 at the ball bearing 47.

The operation of the stepless speed change device according to the abovementioned embodiment will be explained hereinafter, beginning with the operation for changing the speed.

FIGS. 1 and 2 illustrate the initial state wherein the common axis of the driving discs 15 and 16 is axially aligned with or concentric to the axis of the driven disc 31. In this state, the spherical portion 35a at the free end of the feed screw 35 abuts against the receiving member 36 provided on the rocker arm 11. When the hand-wheel 37 is rotated to advance the feed screw 35 into the casing 1, the rocker arm 11 is rocked about the input shaft 6 from the state shown in FIG. 2 to another state shown in FIGS. 3 and 4 so that the common axis of the driving discs 15 and 16 becomes eccentric to the axis of the driven disc 31.

FIG. 3 illustrates in section the wedge-engagement between the driving and driven discs which are eccentric to each other. In this state, the driving disc 31 on both sides is embraced by the oblique conical surfaces 15a and 16a of the driving discs 15 and 16, while these oblique surfaces 15a and 16a are forced toward each other by means of the spring action of the disc springs 20. Therefore, by virtue of forces resulting from the oblique surfaces 15a and 16a, the driving discs 15 and 16 are always subjected to a force for bringing the driving discs 15 and 16 into the initial concentric position. Furthermore, when the hand-wheel 37 is rotated in the reverse direction to retract the feed screw 35, the rocker arm 11 will be returned with the aid of the above force from the position shown in FIG. 4 to the position shown in FIG. 2. In this manner, the common axis of the driving discs 15 and 16 can be controlled from the concentric position to a desired eccentric position relative to the axis of the driven disc 31.

Referring now to the transmission ratio particularly in the case of the highest speed range, in the initial state shown in FIG. 1, the axis of the driving rotary unit A and the driven rotary unit B are concentric to each other, so that the driven disc 31 is maintained in contact with the driving discs 15 and 16 over the entire circumference and embraced thereby under a pressure by means of the coned disc springs 20, with the result that the driving discs 15 and 16 and the driven disc 31 are rotated in unison without slip therebetween.

In this embodiment, the large-diameter gear 25 fixed to the input shaft 6 has seventy-two teeth, while the small-diameter gear 19 of the driving rotary unit A has twenty-four teeth. When the input shaft 6 is rotated one turn, the driving and driven rotary units A and B are rotated three turns at a rotational speed which is three times higher than that of the input shaft 6 ($72/24=3$). Moreover, the small-diameter gear 38 of the driven rotary unit B has twenty-four teeth, while the large-diameter gear 40 integral with the planet carrier has seventy-two teeth. Thus, when the driving and driven rotary units A and B are rotated three turns, the large-diameter gear 40 or the planet carrier is rotated one turn at the rotational speed which is one third of that of the units A and B ($24/72=\frac{1}{3}$). Therefore, the large-diameter gear 40 or the planet carrier is rotated at the same rotational speed as the input shaft 6.

In this case, as the sun gear 44 fixedly secured to the input shaft undergoes rotation at the same rotational speed as the planet carrier 40, the planet gears 43 do not rotate about their respective axes so that the sun gear 44, the planet gears 43 and the internal gear 49 are rotated in unison. In other words, the output shaft 46 integral with the internal gear 49 is rotated at the same rotational speed as the input shaft 6.

Turning to the transmission ratio at the lowest speed range, FIG. 4 illustrates a state wherein the common axis of the driving discs 15 and 16 of the driving rotary unit A is eccentric to the axis of the driven disc 31 of the driven rotary unit B. In this case, the driven disc 31 is in contact with the driving discs 15 and 16 at a contact point C. Under such condition, when the driving discs 15 and 16 are rotated, there is a difference between the rotational radii of the driving discs 15 and 16 and the driven disc 31. That is to say, if it is assumed that the distance or radius between the contact point C and the center $O_1$ of the driving discs 15 and 16 is $R_1$, and the distance or radius between the contact point C and the center $O_2$ of the driven disc 31 is $R_2$, the radius $R_1$ is less than $R_2$ ($R_1 < R_2$). Therefore, the driven disc 31 is rotated at a reduced speed relative to the rotational speed of the driving discs 15 and 16.

In this embodiment, the reduction ratio expressed by $R_1/R_2$ is set at $\frac{1}{3}$. Therefore, when the input shaft 6 is rotated, the driving rotary unit A is rotated at a rotational speed which is three times higher than that of the input shaft 6 owing to the gear ratio between the large-diameter gear 25 and the small-diameter gear 19. As the rotation of the driving rotary unit A is transmitted to the driven rotary unit B with a reduced speed of $\frac{1}{3}$ resulting from the difference between the rotating radii $R_1$ and $R_2$, the driven rotary unit B is rotated one turn when the input shaft 6 is rotated one turn ($3 \times \frac{1}{3} = 1$). Moreover, the rotation of the driven rotary unit B is transmitted to the planet carrier 40 with a reduction ratio of $\frac{1}{3}$ owing to the gear ratio between the small-diameter gear 38 and the large-diameter gear 40. Under such condition, therefore, when the input shaft 6 is rotated one turn, the planet carrier 40 is rotated only one third turn. In other words, the planet carrier 40 is rotated at a reduced speed of $\frac{2}{3}$ relative to the rotational speed of the sun gear 44 ($1 - \frac{1}{3} = \frac{2}{3}$).

Referring to FIG. 5, on the other hand, when the input shaft 6 is rotated in the direction shown by arrow D, the planet gears 43 are revolved about the axis of the input shaft 6 in the direction shown by arrow E by an amount corresponding to the reduced speed, and at the same time rotated about their respective axes in the direction shown by arrow F, respectively. Consequently, the internal gear 49 in mesh with the planet gears 43 is rotated in the direction shown by arrow G at a further reduced rotational speed. In other words, with this planetary gear unit, the reduced speed of the planet carrier 40 is transmitted to the output shaft 46 at a further reduced speed. That is to say, the planetary gear unit serves to enhance or amplify the rotational speed reduction effect. The coefficient with which the reduced rotational speed to be transmitted to the planet carrier 40 is further reduced by the planetary gear unit is referred to as "amplification coefficient".

In this embodiment, the amplification coefficient of the planetary gear unit is selected as 1.5. Therefore, the rotation of the output shaft 46 in the low speed range is retarded by the amplification coefficient of 1.5 which is to be multiplied by the differential rotational amount of the planet carrier 40. As described above, the planet carrier 40 is rotated with the differential rotational speed of $\frac{2}{3}$ relative to the rotational speed of the sun gear 44 or the input shaft 6. Accordingly, the rotational speed of the output shaft 46 is reduced by an amount which is expressed as $\frac{2}{3} \times 1.5 = 1$. Thus, in response to one turn rotation of the input shaft 6, the rotational speed of the output shaft 46 becomes zero or it does not rotate ($1 - 1 = 0$). This is the lowest speed range of the stepless speed change device according to the invention.

According to the invention, by suitably adjusting the rotational position of the hand-wheel 37, the rocker arm 11 can be set at any position from the highest range shown in FIG. 2 to the lowest range position shown in FIG. 4. Therefore, the device according to the invention makes it possible to achieve any transmission ratio between the lowest and highest speed ranges in a stepless manner.

The range of the transmission ratio of the stepless speed change device according to the invention can be changed by selecting a different transmission ratio between the driving and driven elements, displacing the location of the contact point between the frictional discs, or selecting different amplification coefficient of the planetary gear unit. Furthermore, if necessary, the input/output relation of the device can be reversed, by using the output shaft 46 and the input shaft 6 as input and output shafts, respectively.

In the stepless speed change device according to the invention, the driving rotary unit A is adjustable in eccentricity relative to the driven rotary unit B, using the frictional discs 15, 16, 31 for the power transmission, which are urged against each other into an internal wedge-engagement therebetween. Moreover, as in the illustrated embodiment, when the driving discs 15 and 16 and the driven disc 31 in the highest speed range of the device are in concentric relation to each other, they are in pressure-contact substantially over the entire circumference. Consequently, it is possible to achieve a markedly improved transmission efficiency which is as high as approximately 100%, without being accompanied by any slip between the driving and driven discs.

Furthermore, even in the speed range other than the highest speed range, a considerably high transmission efficiency can be readily achieved since the driven disc 31 is eccentric to the driving discs 15 and 16 and partially joined therewith in internal contact, and substantially crescent-shaped contact tracks of the discs extend along their pitch lines over a fairly long distance, and positive and negative slip zones on both sides of the pitch lines are narrow.

Moreover, in the stepless speed change device according to the illustrated embodiment, the transmission ratio of the friction transmission elements is increased by virtue of the amplifying function of the planetary gear unit, so that the transmission ratio can be smoothly changed at any rotational speed ranging from the input rotational speed to zero. Due to a high transmission efficiency at the highest speed range, the illustrated speed change device is particularly useful as a transmission device which requires a stepless speed change in the transitional period only, and which is normally used at the transmission ratio of 1:1.

In the illustrated embodiment, moreover, the driving and driven rotary units A and B are journaled at their both ends so that the axes of the units A and B can readily be maintained in parallel with each other. At the same time, the two driving discs 15 and 16 can be readily maintained in parallel with each other, so that a normal contact relation between these discs can be maintained effectively, even when applied with an eccentric load tending to force the driving discs out of the parallel relation thereby maintaining a high transmission efficiency due to the internal contact of the discs in all the transmission speed ranges.

While the invention has been particularly shown and described with reference to one specific embodiment, it will be understood by those skilled in the art that various modifications and/or alterations including the foregoing and other changes in form and details can be made without departing from the scope of the present invention.

What is claimed is:

1. A friction-type stepless speed change device including an input shaft, an output shaft, a pair of driving discs connected to said input shaft such that they are axially movable relative to each other, and having conical surfaces, respectively, which are arranged opposite to each other, spring means for urging said driving discs toward each other, an annular driven disc connected to said output shaft, said driven disc having an inner peripheral edge which is embraced between and urged against the conical surfaces of said driving discs into a wedge-engagement for generating a frictional force to allow power transmission from the driving discs to the driven disc, means for steplessly varying the eccentricity of said driving discs relative to the driven disc to effect a stepless speed change, first power transmission means defined by a driving rotary unit for transmitting power from the input shaft to the driving discs at an increased rotational speed, and second power transmission means defined by a driven rotary unit for transmitting power from the driven disc to the output shaft at a reduced rotational speed.

2. The speed change device as set forth in claim 1, wherein said driving rotary unit comprises a small-diameter gear which is concentric to said driving discs and meshed with a large-diameter gear on said input shaft.

3. The speed change device as set forth in claim 2, wherein one of the driving discs is provided with a driving shaft at the center of its conical surface, and the other driving disc is provided on the side opposite to its conical surface with a cylindrical shaft having a tapered free end, said cylindrical shaft being fitted on the driving shaft of said one driving disc.

4. The speed change device as set forth in claim 1, wherein said driven rotary unit comprises a support member for supporting said driven disc, said driven disc having an outer periphery which is fixedly secured to said support member.

5. The speed change device as set forth in claim 4, wherein said driven rotary unit further comprises a small-diameter gear fixedly secured to said driven disc support member, and a larger-diameter gear provided concentric to said output shaft and meshed with said small-diameter gear.

6. A friction-type stepless speed change device including an input shaft, an output shaft, a pair of driving discs connected to said input shaft such that they are axially movable relative to each other, and having conical surfaces, respectively, which are arranged opposite to each other, spring means for urging said driving discs toward each other, an annular driven disc connected to said output shaft, said driven disc having an inner peripheral edge which is embraced between and urged against the conical surfaces of said driving discs into a wedge-engagement for generating a frictional force to allow power transmission from the driving discs to the driven disc, means for steplessly varying the eccentricity of said driving discs relative to the driven disc to effect a stepless speed change, first power transmission means defined by a driving rotary unit for transmitting power from the input shaft to the driving discs at an increased rotational speed, and second power transmission means defined by a driven rotary unit for transmitting power from the driven disc to the output shaft at a reduced rotational speed said driving rotary unit comprising a small-diameter gear which is concentric to said driving discs and meshed with a large-diameter gear on said input shaft, wherein one of the driving discs is provided with a driving shaft at the center of its conical surface, and the other driving disc is provided on the side opposite to its conical surface with a cylindrical shaft being fitted on the driving shaft of said one driving disc, and wherein said small-diameter gear is provided with a cylindrical shaft which is fitted on said tapered free end of the cylindrical shaft of the other driving disc.

7. The speed change device of claim 6, wherein said spring means is arranged on the cylindrical shaft of said small-diameter gear.

8. The speed change device as set forth in claim 7, wherein said spring means comprises a plurality of dish-like disc springs.

9. A friction-type stepless speed change device including an input shaft, an output shaft, a pair of driving discs connected to said input shaft such that said discs are axially movable relative to each other, and having conical surfaces, respectively, which are arranged opposite to each other, spring means for urging said driving discs toward each other, an annular driven disc connected to said output shaft, said driven disc having an inner peripheral edge which is embraced between and urged against the conical surfaces of said driving discs into a wedge-engagement for generating a frictional force to allow power transmission from the driving discs to the driven disc, means for steplessly varying the eccentricity of said driving discs relative to the driven disc to effect a stepless speed change, first power transmission means defined by a driving rotary unit for transmitting power from the input shaft to the driving discs at an increased rotational speed, and second power transmission means defined by a driven rotary unit for transmitting power from the driven disc to the output shaft at a reduced rotational speed, wherein said driven rotary unit comprises a support member for supporting said driven disc, said driven disc having an outer periphery which is fixedly secured to said support member, a small-diameter gear fixedly secured to said driven disc support member, and a large-diameter gear provided concentric to said output shaft and meshed with said small-diameter gear, a planetary gear unit which includes a sun gear fixedly secured to said input shaft, a planet carrier formed as said large diameter gear of the driven rotary unit and rotatably supporting planet gears, and an internal gear fixedly secured to said output shaft and meshed with said planet gears.

* * * * *